United States Patent [19]

Greer et al.

[11] Patent Number: 4,554,648
[45] Date of Patent: Nov. 19, 1985

[54] ELECTRONIC EARTH SEISMIC NOISE MEASURING METHOD

[75] Inventors: Charles B. Greer, Lenoir, N.C.; Donald W. Keehan, Fairfax; John A. Springer, Alexandria, both of Va.

[73] Assignee: The United States of America as represented by the Secretary of the Army, Washington, D.C.

[21] Appl. No.: 409,251

[22] Filed: Aug. 18, 1982

Related U.S. Application Data

[63] Continuation-in-part of Ser. No. 165,586, Jul. 3, 1980.

[51] Int. Cl.$^4$ .......................... G01V 1/00; H04B 11/00
[52] U.S. Cl. ......................................... 367/49; 367/65; 367/136
[58] Field of Search ................. 367/13, 14, 35, 49, 367/86, 135, 901, 65, 136, 140; 181/101, 401; 73/579

[56] References Cited

U.S. PATENT DOCUMENTS

| | | | |
|---|---|---|---|
| 3,681,750 | 8/1972 | Larka | 367/135 |
| 3,726,129 | 4/1973 | Thorne | 73/579 |
| 3,938,072 | 2/1976 | Baird et al. | 367/140 |
| 4,158,832 | 6/1979 | Barnes, Jr. et al. | 367/49 X |

Primary Examiner—Nelson Moskowitz
Assistant Examiner—Brian S. Steinberger
Attorney, Agent, or Firm—John E. Becker; Anthony T. Lane; Robert P. Gibson

[57] ABSTRACT

A novel method for electronically determining the gross characteristics of the top layer of the earth's crust at a given location by using a passive seismic transducer as a sensing device for sensing background seismic noise in conjunction with as assembly of generally conventional miniature low power electronic components arranged in a system containing analog and logic circuits with a read-out meter calibrated to represent the detected background noise as seismic resonant frequency. The electronic determination of the crust character is in lieu of various conventional soil refractometry tests which are lengthy time-consuming procedures. The seismic resonant frequency has been found to be representative of the thickness and of the property or character of the crust at that particular geographical location. More specifically, this novel electronic method with related apparatus further is uniquely applicable to determine the crust's character and thus the effect thereof on seismic performance of any seismic sensor device to be used thereat to sense potential various encroaching traffic activity within a selective predeterminable range.

1 Claim, 1 Drawing Figure

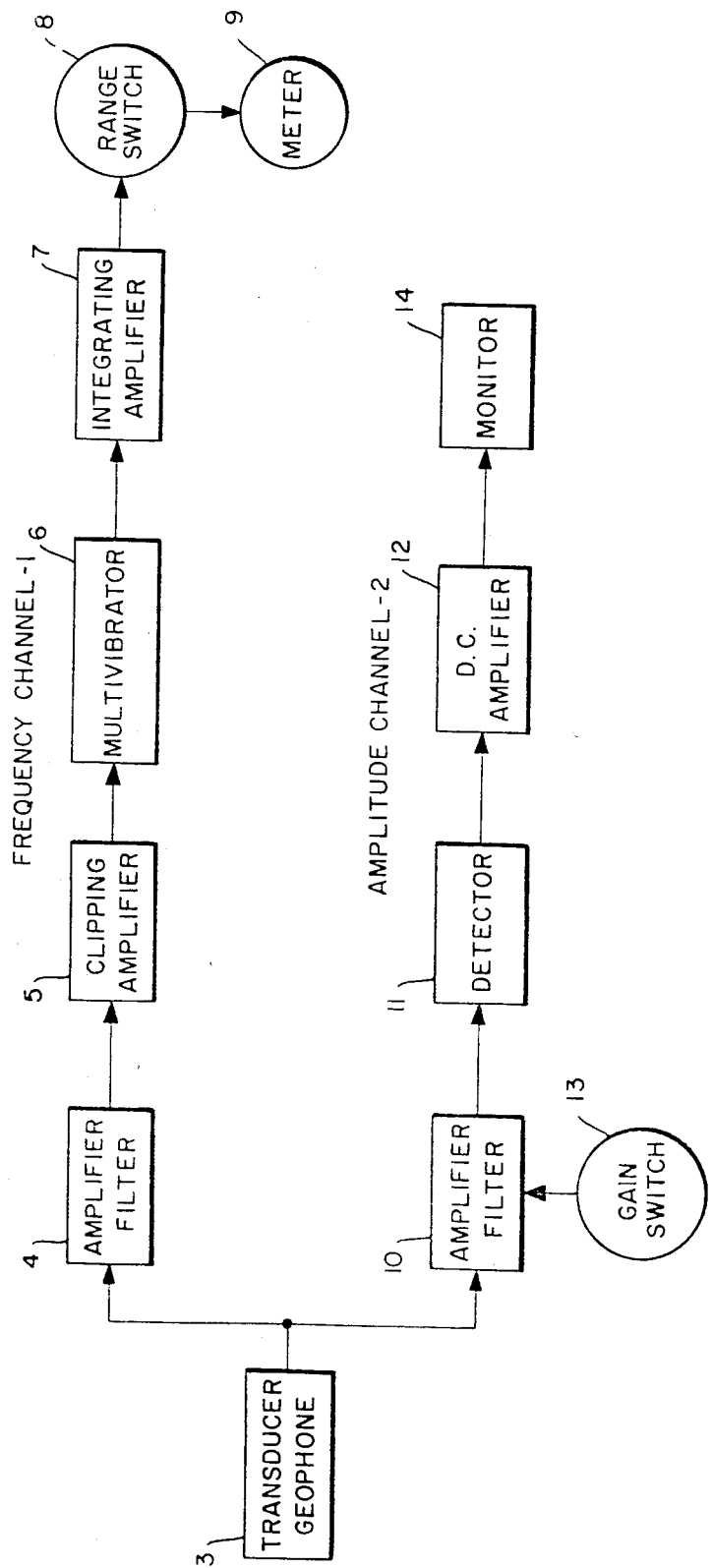

ELECTRONIC EARTH SEISMIC NOISE MEASURING METHOD

The invention described herein may be manufactured, used and licensed by or for the Government for governmental proposed without the payment to me of any royalties thereon.

This application is a continuation-in-part of Application Ser. No. 165,586, filed July 3, 1980.

BACKGROUND OF THE INVENTION

This invention relates to earth soil character measurements and more particularly to a method for electronically determining the earth's crust character and its effect on transmissivily therethrough of seismic signals, using a passive seismic transducer as the sensing device.

The system operates on the principle that an earth's background noise signal is present at any given location. The background noise signal may be derived from a variety of random background sources, singly and/or collectively, such as rain, seashore wave activity, wind, miscellaneous far distant land or air traffic activity etc., the signal of which is measured as background noise resonance frequency. This noise frequency is known to vary for different geological locations. The small signals generated by natural and cultural background are passed by the cover of the earth's surface which acts as a sounding board for small signals. Field testing has shown that these small signals predominate when no other signal sources are within detection range of a Geophone. This system takes these low level signals, amplifies them, and determines what the noise frequency of the earth is at that geological location. The noise frequency of the earth at a given location is directly related to the geological constuction or formation of the earth at that location; i.e., the thickness and material of the first layer of soil.

In so far as applicants are aware, the technique or method of using seismic signatures to determine the approximate characteristics of the earth's crust is a new concept. Applicants are aware of seismic prospecting systems such as the system disclosed in U.S. Pat. No. 3,221,297 to Smith et al. In systems such as disclosed in the said Smith et al patent, a composite seismic signal is obtained by recording, individually, the reflections of a number of generated single frequency signals. Such systems do not use the seismic signature of the earth to determine the resonance or background noise frequency of the earth, and are not concerned with the thickness of the first layer of soil. Applicants are further aware of U.S. Pat. No. 4,158,832, to Barnes et al dated June 19, 1979, which discloses a specific seismic apparatus embodying electronic circuitry to purportedly identify the presence and classify the type of vehicle source generating a seismic signature. The present electronic method and novel applicable use is very helpful to enhance the system of said Barnes et al U.S. Pat. No. 4,158,832 by making it truly effective irrespective of in which geographical area it is attempted to be used.

SUMMARY OF THE INVENTION

A novel electronic method and system for determining the noise frequency of the earth by using a passive transducer is disclosed. The system includes a frequency channel and an amplitude channel both coupled to the output of the transducer.

The frequency channel includes an amplifier filter, a clipping amplifier, a mulitivibrator and an integrating amplifier. The output of the integrating amplifier is coupled to a range switch which in turn is coupled to a meter. The output of the integrating amplifier is a D.C. level corresponding to a frequency range of 4 to 100 hertz or 4 to 200 hertz. The meter provides a frequency reading based on the current generated by the integrating amplifier.

The amplitude channel includes an amplifier filter, a detector and a D.C. amplifier. The output of the amplitude channel is utilized for recording or monitoring the amplitude of the signals sensed by the transducer; i.e., for discriminating between desired and undesired interference signals. The method hereof is novelly useful to determine the effect of the earth's crust on seismic signal activity, whether in conjunction with the same or any other seismic sensor devices usable to determine the presence of potential encroaching traffic activity in a given area, such as disclosed herein or in the aforesaid U.S. Pat. No. 4,158,832.

BRIEF DESCRIPTION OF THE DRAWING

A full and complete understanding of the invention can be obtained from the following detailed description of the invention when read in conjunction with the annexed drawing in which the single FIGURE shows a block diagram of exemplary apparatus used in practicing the method of the invention.

DETAILED DESCRIPTION OF THE INVENTION

Referring to the drawing, the single FIGURE shows an exemplary embodiment of apparatus in block diagram form used in performing the method hereof. As shown in the drawing, the apparatus includes a frequency channel 1 and an amplitude channel 2 both coupled to a transducer 3 which may be a Geophone. Transducer 3 has a frequency response and sensitivity to detect signals from 4 hertz to 200 hertz.

Frequency channel 1 includes the amplifier filter 4 coupled to the output of transducer 3, a clipping amplifier 5 coupled to the output of amplifier filter 4, a multivibrator 6 coupled to the output of clipping amplifier 5, an integrating amplifier 7 coupled to the output of multivibrator 6, a range switch 8 coupled to the output of integrating amplifier 7, and a meter 9 coupled to range switch 8.

Amplifier 4 amplifies and filters the signals from transducer 3 and applies this amplified signal to clipping amplifier 5 which produces a square wave corresponding to the input frequency of the signals sensed by transducer 3. The square wave output from clipping amplifier 5 triggers multivibrator 6. The output of multivibrator 6 is intregrated by integrating amplifier 7 which produces a D.C. level corresponding to a frequency range of 4 to 100 hertz or 4 to 200 hertz. This output from integrating amplifier 7 is coupled to meter 9 through range switch 8. Meter 9 provides a frequency read out based on the current generated by the integrated signals from integrating amplifier 7.

A typical example in a case where the first layer may be a deep layer of sand, for example approximately 50' deep, the output signal frequency of meter 9 might be 20 hertz, which is relatively low, whereas in the case of a thin first layer of soil which may be only a few inches thick over a substrate such as rock, the output frequency of meter 9 might be 90 hertz, which is relatively high. Other frequencies within the range between 20 and 90 hertz would reflect a first layer of an intermediate depth, with consideration given to the physical characteristics of other types of soils. A typical intermediate frequency reading for an intermediate depth layer of sandy soil might be in the 35-40 hertz range.

Amplitude channel 2 includes the amplifier filter 10, the detector 11 coupled to the output of amplifier filter 10, a D.C. amplifier 12 coupled to the output of detector 11 and the monitor 14 coupled to the output of D.C. amplifier 12. Amplifier 10 is provided with a gain switch 13 to selectively control the gain of amplifier filter 10.

The output signals from transducer 3 are amplified by amplifier filter 10 which has a gain selection of 40, 50 or 60 DB. The output signals from amplifier filter 10 are applied to the input of detector 11 which produces a D.C. signal that is proportional to input amplitude. This D.C. signal which is amplified by D.C. amplifier 12 is provided for recording or monitoring the magnitude of the background signals sensed by transducer 3. These signals are monitored by monitor 14 which may be a recorder or any other suitable monitoring means. The recorder would serve to discriminate between desired and undesired interference signals, for example, the interference signal produced by an aircraft in the nearby vicinity. It will be appreciated that the amplitude channel 2, as a monitoring means, is not essential to the operation of this invention in isolated circumstances where interference signals are not present.

It is apparent that the disclosed block diagram sets forth a unique assembly of conventional components or subassemblies. In this respect, for example, the block components 4, 5, 7, 10, 11 and 12 preferably may be known conventional operational amplifiers, such as an $\mu a776$ product of Fairchild Semiconductor Company, as illustrated in their brochure having a copyrighted date of 1972. Block item 6 is preferably configured as a multivibrator such as the RCA CMOS CD 4047 multivibrator. Item number 8 may be a conventional selector type switch. Item number 9 may be a known type of microammeter. The gain switch 13 component can be replaced or omitted once the gain has been established and block item 14 may be a known type of standard operational amplifier, such as the Signetics $\mu a741$.

The novel method and use of the exemplary seismic apparatus focuses more particularly on the disclosed electronic method. This method determines the gross characteristics of the top layer of the earth's crust at a given location by use of a passive seismic transducer such as the Geophone 3 in conjunction with the above-described exemplary miniature low power electronic system embodying analog and logic circuits with a readout meter 9. More specifically the method and novel use of conventional apparatus determines the seismic activity of the earth at that geological/geographical location, in that the detected seismic resonant frequency is found to be representative of the soil character thereat. Having novelly obtained this information electronically versus prior art conventional refractometry or so-called "drop-hammer" techniques, the determination then may be novelly applied, in conjunction with any seismic activity detection sensor apparatus. The procedure or method includes sensing background noise signals in the form of resonant frequency signals usually within a bandwidth of from 4-200 hertz using a passive type transducer such as a Geophone disposed within the earth's surface; then amplifying and filtering said frequency signals from the Geophone; thereafter applying the amplified signal to a clipping amplifier to produce a square wave that corresponds to the input frequency of said signals picked up and produced by the Geophone 3; then applying the output of the clipping amplifier to trigger a multivibrator whose multivibrator output signal is then applied to an integrating amplifier which integrates the multivibrator's output signal so as to generate a D.C. signal; and then applying the output D.C. signal to a frequency meter which is calibrated to produce a frequency reading of the signal or signals sensed or detected by the Geophone. Additionally, it is preferrable to utilize interference signal discriminating means to be applied to the output of said for producing a D.C. voltage signal which is proportional to the amplitude of any signal in the selected or predeterminable nearby vicinity usually within a bandwidth of from 4-200 hertz.

Therefore, by means of this novel method and usage, quick and effective operation of the seismic sensing apparatus will now produce meaningful readings to enable the operators or users to effectively detect and/or try to classify (as per U.S. Pat. No. 4,158,832) the source of approaching traffic generating the detected seismic activity.

While the novel method and use of aforesaid invention has been discussed with reference to or in conjunction with some specific illustrative forms of seismic signal detecting and processing componentry, it should be apparent to those skilled in the art that the method and unique usage or application can be practiced with various other forms of seismic detecting and/or signal processing apparatus

What is claimed is:

1. A method for both electronically determining the approximate gross character of the earth's outer crust or soil layer as to general type, depth, and range, and in turn for determining the effect thereof upon transmissivity of background seismic noise therethrough, thus providing a visual readout indication of the soil's effect on the performance of seismic sensor devices, said method being useful to initially set or calibrate any suitable site-adapting seismic sensor device designed to inherently sense soil properties, and being in lieu of time-consuming soil refractometry tests, thus enhancing any seismic sensor device's operation to optimize potential identification of any encroaching vehicle, aircraft or pedestrian traffic which inherently generates seismic signal activity, said method comprising the steps of:

(a) implanting a passive type transducer such as a geophone in the earth's crust, in association with an electronic circuit means coupled to the output of said transducer/geophone which is capable of detecting seismic signature frequency signals from 4-200 hertz;

(b) utilizing the earth's crust which is considered to be a band-pass filter of unknown characteristics and sensing inherent background seismic noise or signature within the earth by use of the transducer/geophone to detect and produce a readout as hereinafter of that seismic noise in the form of resonant frequency within a bandwidth of from 4-200 hertz;

(c) amplifying and filtering the resonant frequency detected by the transducer/geophone (d) applying said amplified signal to a clipping amplifier to produce a square wave that corresponds to the frequency of said signals produced by said transducer/geophone;

(e) applying the output of said clipping amplifier to trigger a multivibrator;
(f) applying the output signal of said multivibrator to an integrating amplifier to integrate said multivibrator output signal to generate a D.C. signal;
(g) applying the output signal of said integrating amplifier to a frequency meter that is adapted to indicate the frequency of the signal sensed by said transducer/geophone as a visual readout of the resonant frequency of the earth's effect on performance of seismic sensor devices; and
(h) utilizing the sensed data to then adjust or readjust bandpass performance and gain of said site-adapting seismic sensor device to optimize the potential seismic detection.

* * * * *